(12) United States Patent
Grönholm

(10) Patent No.: US 10,118,450 B2
(45) Date of Patent: Nov. 6, 2018

(54) TOW BAR ASSEMBLY AND DOLLY COMPRISING THE SAME

(71) Applicant: K. Hartwall Oy Ab, Söderkulla (FI)

(72) Inventor: Jack Grönholm, Söderkulla (FI)

(73) Assignee: K. Hartwell Oy Ab, Soderkulla (FI)

( * ) Notice: Subject to any disclaimer, the term of this patent is extended or adjusted under 35 U.S.C. 154(b) by 47 days.

(21) Appl. No.: 15/528,471

(22) PCT Filed: Nov. 10, 2015

(86) PCT No.: PCT/FI2015/050781
§ 371 (c)(1),
(2) Date: May 19, 2017

(87) PCT Pub. No.: WO2016/079377
PCT Pub. Date: May 26, 2016

(65) Prior Publication Data
US 2017/0349013 A1    Dec. 7, 2017

(30) Foreign Application Priority Data
Nov. 21, 2014   (EP) .................................. 14194220

(51) Int. Cl.
*B60D 1/54* (2006.01)
*B60D 1/155* (2006.01)
(Continued)

(52) U.S. Cl.
CPC ............ *B60D 1/155* (2013.01); *B62B 5/0079* (2013.01); *B62D 63/08* (2013.01); *B60D 2001/005* (2013.01); *B62B 2207/00* (2013.01)

(58) Field of Classification Search
CPC ........ B60D 1/155; B60D 1/54; B62B 5/0079; B62D 63/08
(Continued)

(56) References Cited

U.S. PATENT DOCUMENTS 6,135,485 A * 10/2000 Filbrun .................... B60D 1/00
                                                    280/493
7,011,329 B2 * 3/2006 Yoder .................... B60D 1/143
                                                    280/485
(Continued)

FOREIGN PATENT DOCUMENTS

EP    2778015 A1    9/2014
FR    2876957 A1    4/2006
(Continued)

OTHER PUBLICATIONS

European Patent Office, European Search Report issued in application No. EP 14194220, dated Apr. 28, 2015, Munich.
(Continued)

*Primary Examiner* — Tony H Winner
(74) *Attorney, Agent, or Firm* — Chernoff, Wilhauer, McClung & Stenzel, LLP

(57) ABSTRACT

The present invention provides a tow bar assembly, which may be retrofitted to a dolly while maintaining convenient space saving properties of permanently fitted tow bars. The novel tow bar assembly includes a tow bar, a shaft and a biasing member, such as a spring, biasing the tow bar towards an upright orientation about an axis of revolution. The shaft has a first end and a second end, which opposes the first end. The shaft connects the tow bar to the dolly from the ends so as to provide rotation of the tow bar in respect to the dolly about the axis of revolution. The shaft features an inner cavity, which extends along the axis of revolution. The biasing member is arranged into the cavity of the shaft and rotationally secured thereto. The shaft also features a first end plug at the first end of the shaft for enclosing the biasing member to the cavity. The first end plug rotationally locks the biasing member to the dolly.

17 Claims, 7 Drawing Sheets

(51) Int. Cl.
*B62B 5/00* (2006.01)
*B62D 63/08* (2006.01)
*B60D 1/00* (2006.01)

(58) Field of Classification Search
USPC .................................................. 280/493, 494
See application file for complete search history.

(56) References Cited

U.S. PATENT DOCUMENTS

| 8,662,522 B1* | 3/2014 | Hunt, III | B60D 1/52 |
| | | | 280/491.5 |
| 9,463,675 B2* | 10/2016 | Korhonen | B60D 1/54 |
| 2012/0205894 A1* | 8/2012 | Tindall | B60D 1/155 |
| | | | 280/491.1 |
| 2014/0312595 A1* | 10/2014 | Knowles | B60D 1/54 |
| | | | 280/491.3 |

FOREIGN PATENT DOCUMENTS

| FR | 2966120 A1 | 4/2012 |
| WO | 2012072856 A1 | 6/2012 |

OTHER PUBLICATIONS

World Intellectual Property Office, International Search Report issued in application PCT/FI2015/050781, dated Feb. 8, 2016, Rijwsijk.

World Intellectual Property Office, Written Opinion of the International Searching Authority issued in application PCT/FI2015/050781, dated Feb. 8, 2016, Munich.

\* cited by examiner

TOW BAR ASSEMBLY AND DOLLY COMPRISING THE SAME

FIELD OF THE INVENTION

The present invention relates to transporting goods. In particular, the invention relates to dollies, on which parceled goods are transported and stored temporarily. To be precise, the invention relates to a tow bar assembly and to a dolly comprising the same.

BACKGROUND ART

There is known a vast variety of different devices used for transporting parceled goods. Typically pieces or stacks thereof are loaded onto a wheeled platform, on which they are conveyed to shop floor or storage. These wheeled platforms are called dollies. Some dollies are equipped with a tow bar for transporting a plurality of dollies in a chained fashion. When the tow bar for pulling the dolly is temporarily not used, it is typically pivoted in an upright position for saving space. U.S. Pat. No. 4,856,810 proposes one solution to providing a space saving tow bar for a dolly. The tow bar known from U.S. Pat. No. 4,856,810 must be manually manipulated into the vertical space saving position.

A solution for biasing the tow bar to the vertical position is proposed by EP 2278015, which discloses a biasing mechanism, which connects the tow bar to the dolly. The biasing mechanism includes an axle fixed to the dolly and a spring arranged around the axle and tensioned between the tow bar and the chassis of the dolly. The spring biases the tow bar to rotate it about the fixed axle towards an upright position. The biasing mechanism known from EP 2278015 has the additional benefit of assisting coupling between the tow bar and the receiving socket of another dolly.

The tow bars known from U.S. Pat. No. 4,856,810 and EP 2278015 are both permanently fixed to the dolly. Detachable tow bars are also known for retrofitting a tow bar to a dolly. Such tow bars typically feature a quick coupling between a plug on the tow bar and a corresponding socket, which is to be fixed to the dolly for receiving the tow bar. While detachable tow bars improve modularity of dollies, they lack the benefit of saving space by biasing the tow bar to an upright position.

It is therefore an aim of the present invention to provide a tow bar assembly, which may be retrofitted to a dolly while maintaining convenient space saving properties of permanently fitted tow bars.

SUMMARY

The aim of the present invention is achieved with aid of a novel tow bar assembly including a tow bar, a shaft and a biasing member, such as a spring, for biasing the tow bar towards an upright orientation about an axis of revolution. The shaft has a first end and a second end, which opposes the first end. The shaft connects the tow bar to the dolly from the opposing ends so as to provide rotation of the tow bar in respect to the dolly about the axis of revolution. The shaft features an inner cavity, which extends along the axis of revolution. The biasing member is arranged into the cavity of the shaft and rotationally secured thereto. The shaft also features a first end plug at the first end of the shaft for enclosing the biasing member to the cavity. The first end plug rotationally locks the biasing member to the dolly.

The aim of the present invention is on the other hand achieved with aid of a dolly including such a novel tow bar assembly.

Considerable benefits are gained with aid of the present invention. The proposed tow bar assembly may be conveniently retrofitted to a dolly thus significantly improving modularity. Because the assembly contains a biasing mechanism, the tow bar will spring to an upright position automatically thus saving space when detached from another dolly without manual user interference. The spring action of the biasing mechanism also aids the coupling of the hitch of the tow bar to the socket of another dolly.

BRIEF DESCRIPTION OF DRAWINGS

In the following, exemplary embodiments of the invention are described in greater detail with reference to the accompanying drawings in which.

DETAILED DESCRIPTION OF EXEMPLARY EMBODIMENTS

Figure 1:
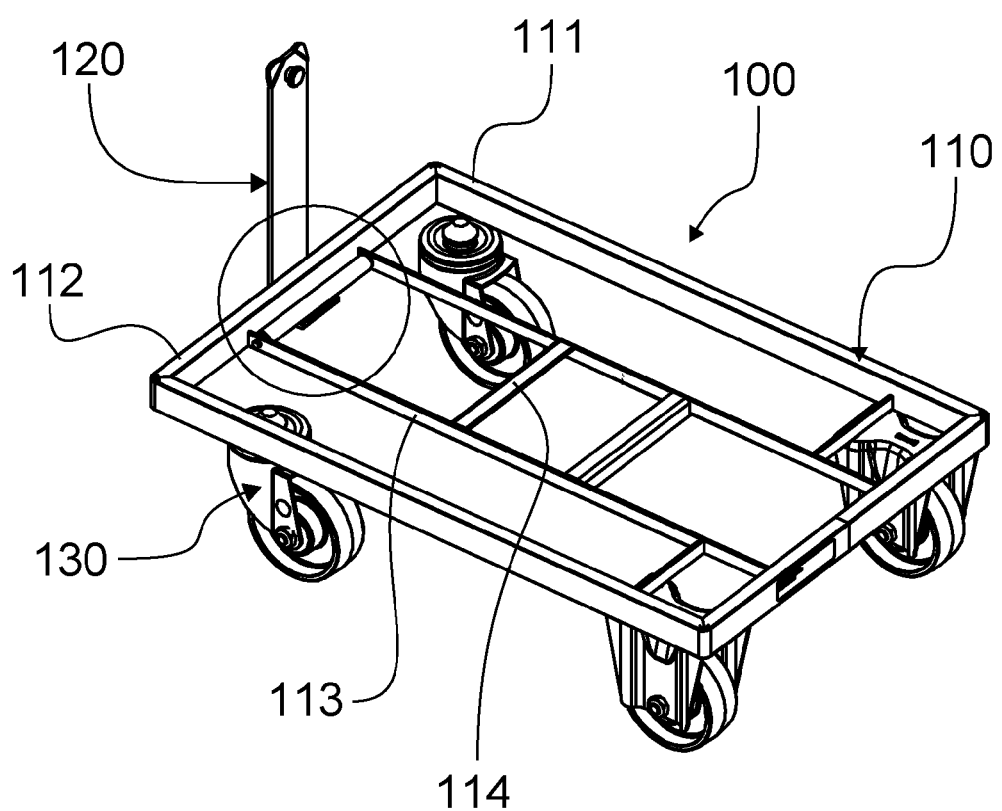
FIG. 1 presents an isometric top view of a dolly with a tow bar assembly according to one embodiment, wherein the castor mount plates have been omitted for illustrative purposes.

As shown in FIG. 1, the tow bar assembly 120 may be retrofitted to a dolly 100 having a typical construction including a chassis 110 with two mutually parallel longitudinal peripheral beams 111 and two mutually parallel transversal peripheral beams 112 connected by the longitudinal peripheral beams 111 to form a rectangular frame. Castors 130 are connected to the underside of the rectangular chassis 110 through mount plates, which have been omitted from the drawings for showing details of connecting the tow bar 120 to the dolly 100. The castors 130 include swivel castors arranged to the front end of the dolly 100, which features the tow bar assembly 120, and fixed castors arranged to the rear end of the dolly 100, which features a female counterpart of a hitch (not shown) for receiving a male counterpart of a hitch of a tow bar of another dolly (not shown). The longitudinal peripheral beams 111 extend in the main travelling direction of the dolly 100, i.e. in the direction steered to by the fixed castors. Accordingly, the transversal peripheral beams 112 extend in a direction perpendicular to the longitudinal peripheral beams 111 and therefore to the main travelling direction. The chassis 110 also includes at least two mutually parallel longitudinal cross beams 113, which are distanced from each other in the transversal direction. The longitudinal cross beams 113 extend parallel to the longitudinal peripheral beams 111 and connect the transversal peripheral beams 112 within the rectangular frame of the chassis 110.

Figure 2:
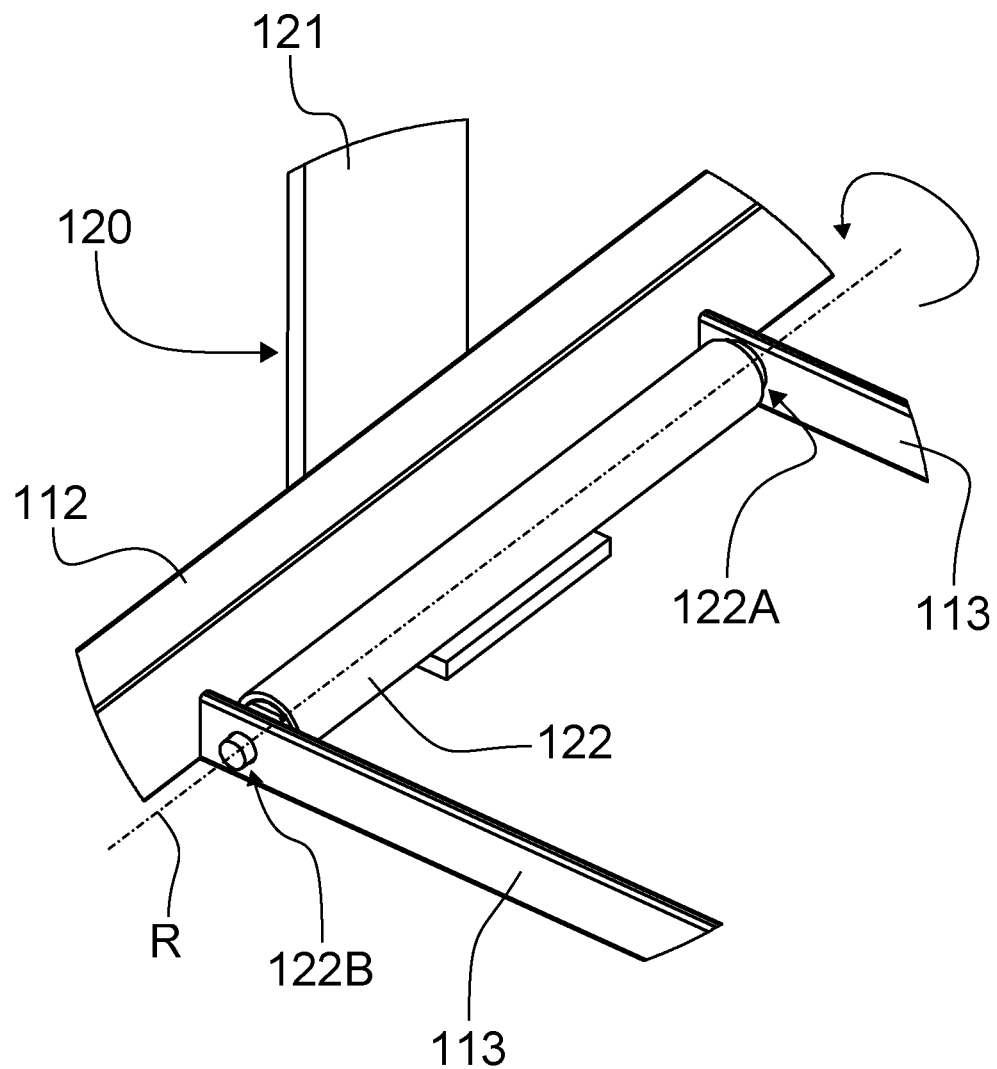
FIG. 2 presents a detailed view of the highlighted section of the tow bar assembly of FIG. 1.
Figure 3:
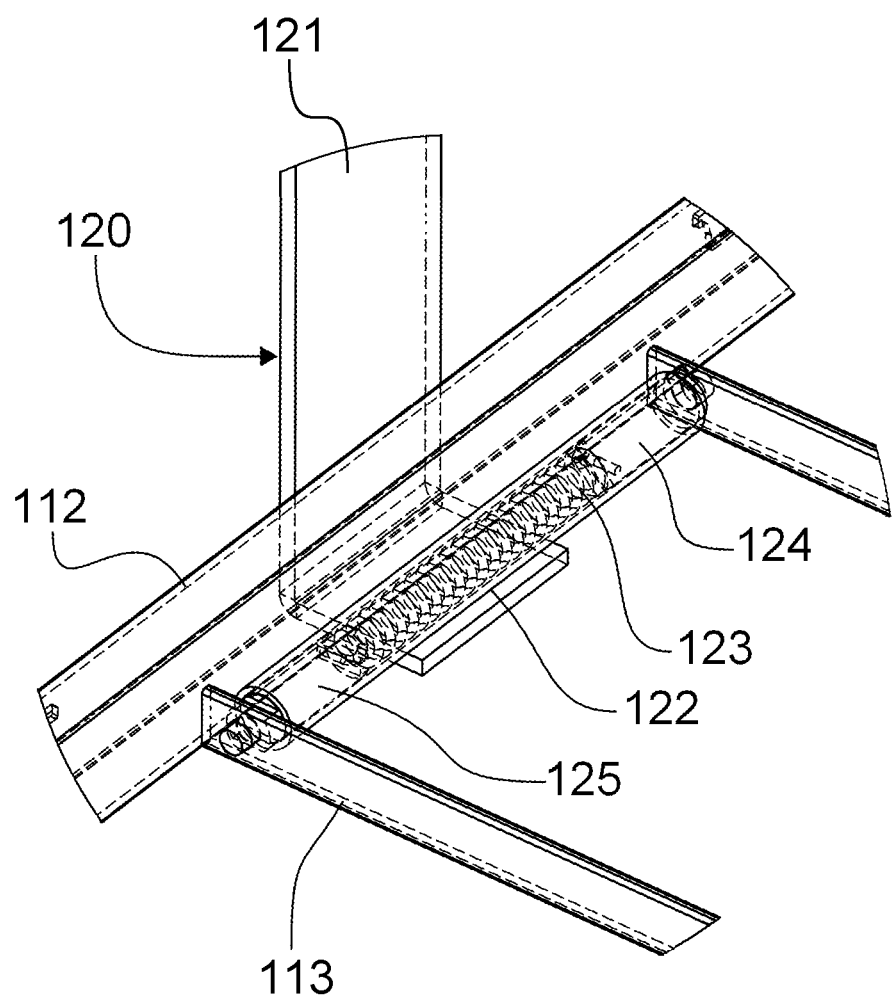
FIG. 3 presents a type E view of FIG. 2 showing the hidden outlines of internal components of the tow bar assembly.
Figure 4:
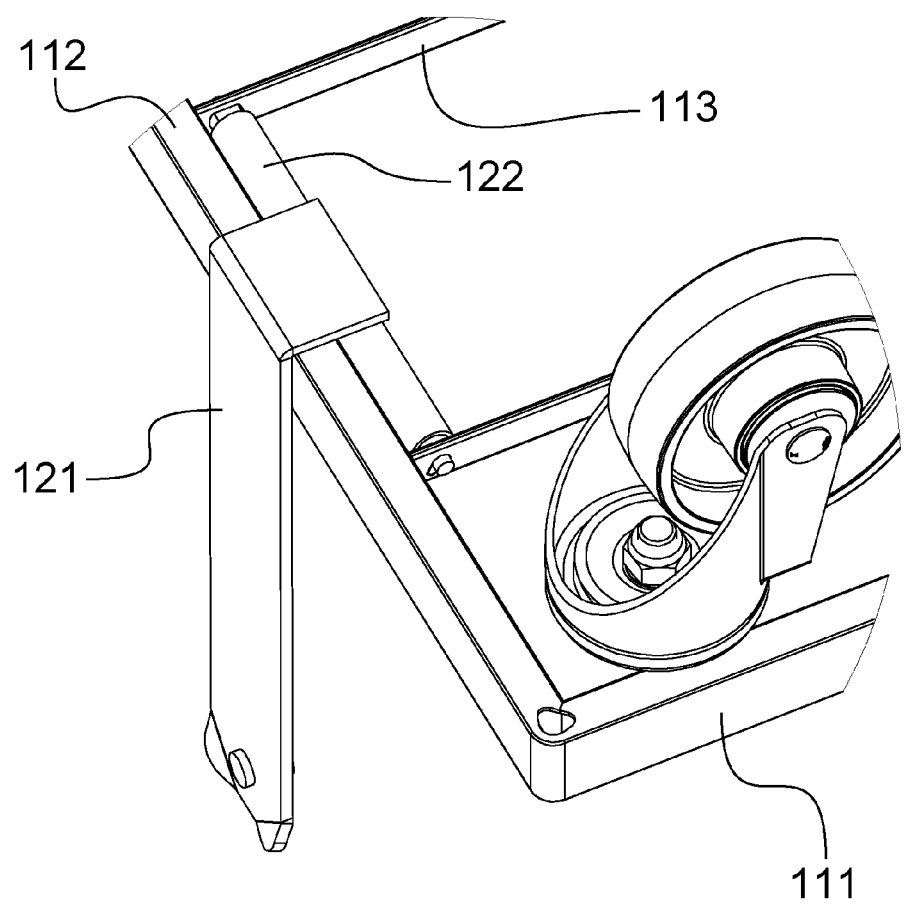
FIG. 4 presents a detailed bottom view of the highlighted section of the tow bar assembly of FIG. 1.

Turning now to FIGS. 2 to 4, which show the relationship between the tow bar assembly 120 and the chassis 110 of the dolly 100. The longitudinal cross beams 113 contain pivot points for providing an axis of revolution R for the tow bar assembly 120 (FIG. 2). The tow bar assembly 120 contains a tow bar 121 and a shaft 122, which is fixed thereto. The shaft 122 spans between the longitudinal cross beams 113 within the periphery of the frame of the chassis 110, whereby the shaft 122 is protected by the frontal transversal peripheral beam 112 (FIG. 4). More specifically, the shaft 122 has a first end 122A and a second end 122B, which opposes the first end 122A, whereby the shaft 122 is connected to the longitudinal cross beams 113 from the ends 122A, 122B. The axis of revolution R is therefore formed between and through the first and second end 122A, 122B of the shaft 122 (FIG. 2).

FIGS. 1 and 3 show how the tow bar 121 includes two sections, where the terminal end of a first section features a male counterpart of a hitch and where a second section extends from the first section in an angled manner. The shaft 122 is fixed to said second section of the tow bar 121. The shaft 122 is used to house the biasing mechanism of the tow bar assembly. The components housed inside the shaft 122 are illustrated by dotted lines in FIG. 3 and by solid lines in the explosion view of FIG. 5. To facilitate the housing of the biasing mechanism the shaft 122 includes an inner cavity, which extends along the axis of revolution R. Firstly, the biasing mechanism includes a biasing member 123, which is provided to the inner cavity of the shaft 122. In the embodiment shown in the FIGS. the biasing member 123 is a spring, more specifically a coil spring.

The biasing mechanism also includes two end plugs 124, 125 for closing the ends 122A, 122B of the shaft 122 and for enclosing the biasing member 123 to the inner cavity of the shaft 122. A first end plug 124 is connected to the first end 122A of the shaft 122 through a sliding fit, whereby rotation between the first end plug 124 and shaft 122 is allowed.

The first end plug 124 has three functions:
1. to enclose the biasing member 123 to the inner cavity of the shaft 122,
2. to enable pre-tensioning of the biasing member 123 and to
3. to rotationally lock the biasing member 123 to the dolly 100 in the fully assembled state.

The features of the first end plug 124 enabling the three functions are discussed in greater detail hereafter.

The second end plug 125 is fixed to the second end 122B of the shaft 122 for enclosing the biasing member 123 to the cavity. The end plugs 124, 125 are connected by the biasing member 123. The first end 122A of the shaft 122 is rotatable in respect to the dolly 100 by means of the sliding fit between the shaft 122 and the first end plug 124, which in turn is angularly locked to the dolly 100. On the other hand the second end 122B of the shaft 122 may be rotated in respect to the dolly 100 by means of the sliding fit between the dolly 100 and second end plug 125, which in turn is fixed to the shaft 122. To facilitate this function the second end plug 125 rotationally locks the biasing member 123 to the shaft 122. The features of the second end plug 125 enabling the three functions are discussed in greater detail hereafter. It is to be, however, understood that the angular displacement between the first end plug 124, which is angularly fixed to the dolly 100 but rotatable connected to the shaft 122, and second end plug 125, which is rotatably connected to the dolly 100 but angularly fixed to the shaft 122, causes the biasing member 123 there between to undergo winding. Accordingly, the biasing member 123 may contain spring properties to resist winding and potentially also compression. Such spring properties may be achieved by means of a coil spring.

Figure 5:
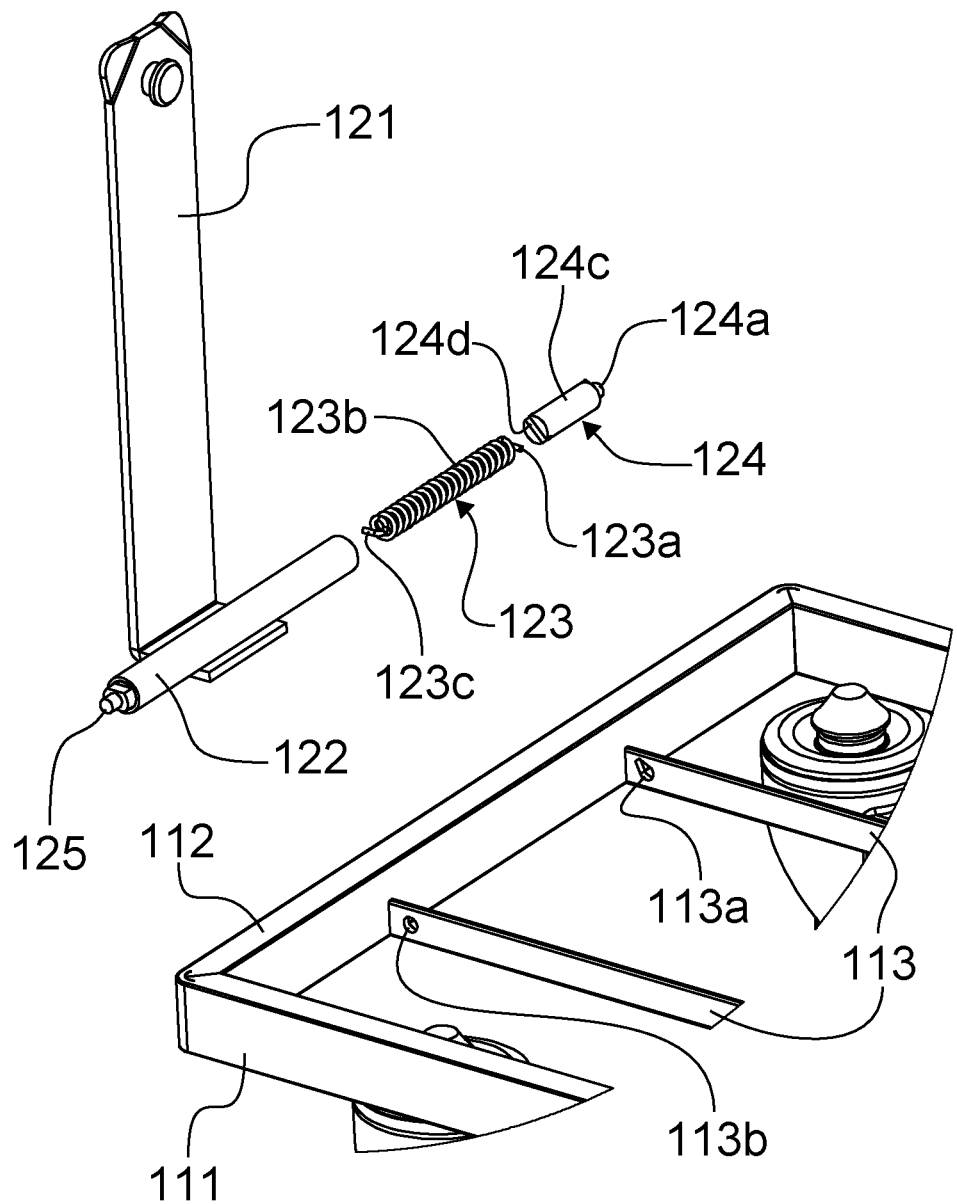
FIG. 5 presents a detailed explosion view of the tow bar dolly and tow bar assembly of FIG. 1.
Figure 6:
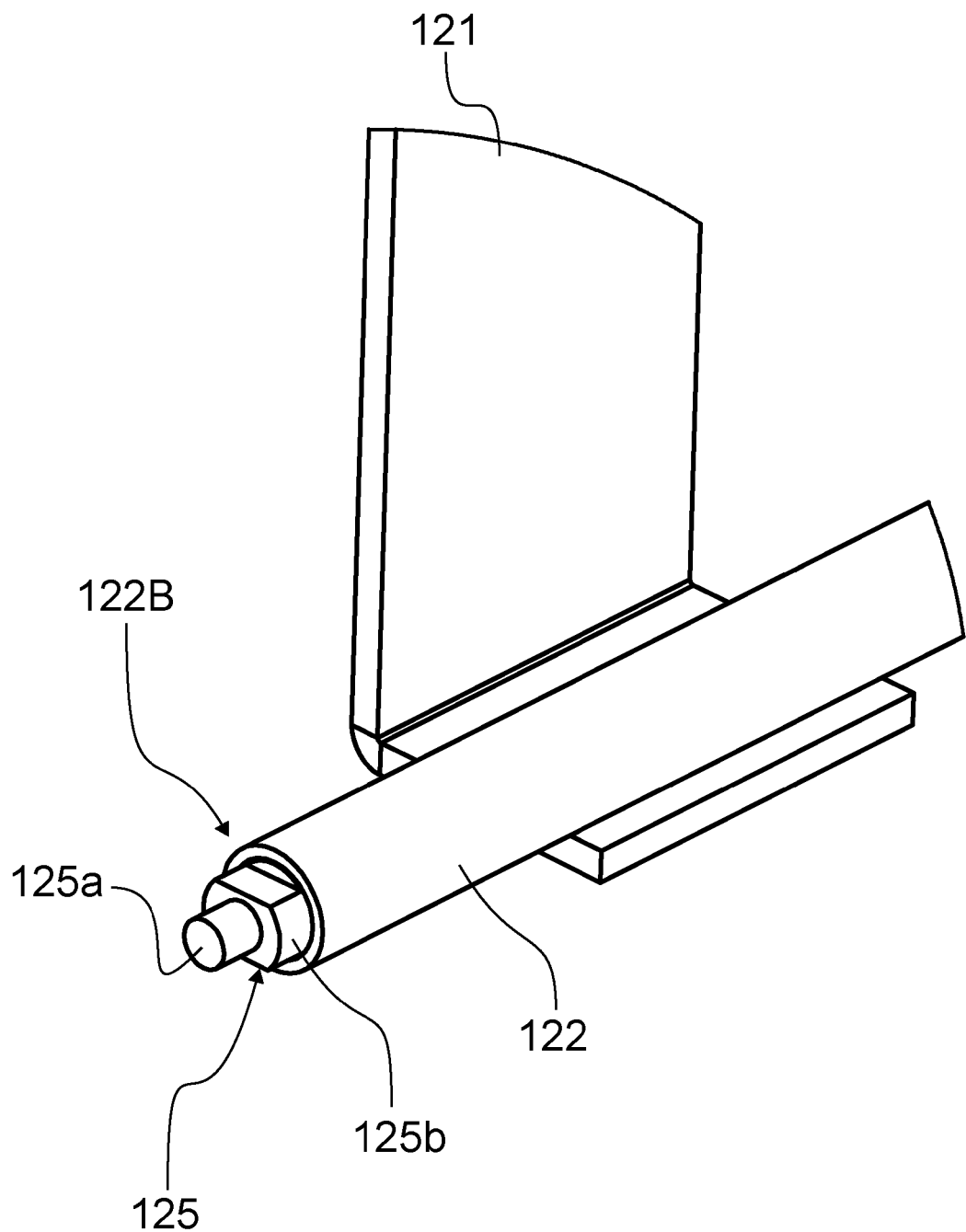
FIG. 6 presents a detailed view of the second end of the shaft, i.e. the proximal end, of the tow bar assembly of FIG. 5.
Figure 7:
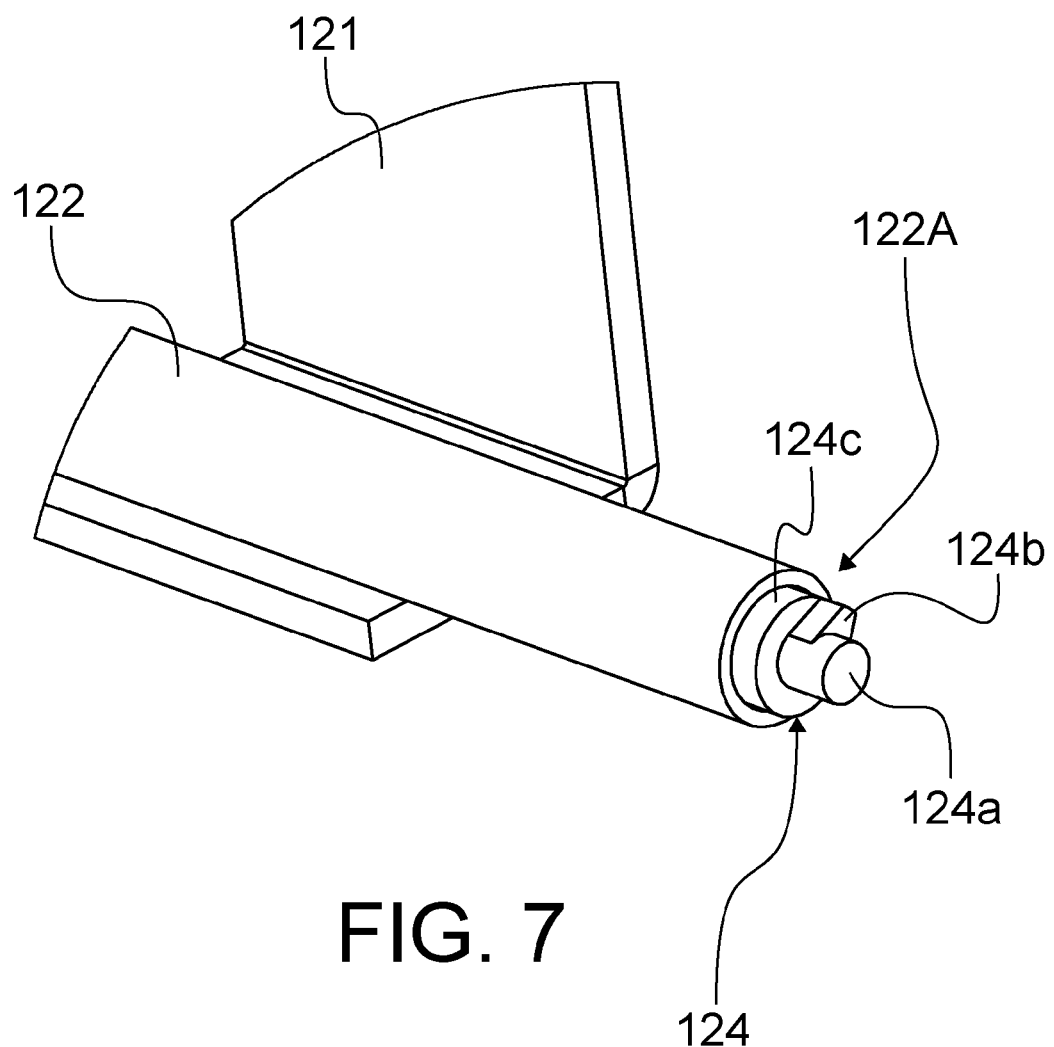
FIG. 7 presents a detailed view of the first end of the shaft, i.e. the distal end, of the tow bar assembly of FIG. 5.

Turning now to FIGS. 5 to 7, which show the details of the end plugs 124, 125 of the shaft 122 and the interface between tow bar assembly 120 and the dolly 100. As can be seen from FIG. 5, the longitudinal cross beams 113 feature pivot points 113a, 113b for receiving the end plugs 124, 125, respectively. The axis of revolution R passes through the pivot points 113a, 113b which are aligned accordingly. For providing a rotational lock between the first end 122A of the shaft 122 and the dolly 100, the first pivot point 113a is formed as a rotationally non-symmetrical opening 113a. It is to be understood that all references to rotationally symmetrical or non-symmetrical shapes are viewed as rotation about the axis of revolution R, i.e. as rotation about the longitudinal direction of the shaft 122. The rotationally non-symmetrical opening 113a is dimensioned to receive the first end plug 124 in two stages, which are discussed in greater detail hereafter. The second pivot point 113b in the opposing longitudinal cross beam 113 is formed as a rotationally symmetrical opening for receiving the second end plug 125 in a rotatable manner.

In FIG. 5, the biasing member 123 is retracted from the inner cavity of the shaft 122 for showing that according to the illustrated embodiment, the biasing member 123 provided in the form of a coil spring terminates at both ends to a straight portion for coupling to the end plugs 124, 125. In other words, according to a particular embodiment, the biasing member 123 is a coil spring, which includes a first coupling portion 123a. The first coupling portion 123a may take the shape of a straight terminal. The other end of the coil spring terminates to a second coupling portion 124c, which is similar to the first coupling portion 123a, wherein the first and second coupling portions 123a, 123c are joined by a spiral section 123b. In other words, according to one embodiment the biasing member 123 is a flat-ended coil spring.

The connection between the biasing member 123 and the end plugs 124, 125 is provided through cooperating form-locking shapes at the terminal ends of the biasing member and at ends of the end plugs 124, 125 proximal to the biasing member 123. In the illustrated example of FIG. 5, the form locking shape 124d of the first end plug 124 is a groove for receiving the first coupling portion 123a of the biasing member 123. The second end plug has a similar groove (not shown) for receiving the second coupling portion 123c of the biasing member 123.

As described above, the second end plug 125 at the second end 122B of the shaft 122 is fixed thereto to close the second end 122B of the shaft 122. The end plug 125 may be welded to the shaft 122, for example, to ensure strong hold. To facilitate welding, the second end plug 125 includes a rotationally non-symmetrical engagement portion 125b, such as a racetrack oval shape, for engaging with a wrench or similar tool for maintaining the second end plug 125 in a desired angular position in respect to the shaft 122 during welding. Alternatively, the rotationally non-symmetrical engagement portion 125b may be used to dial in the second end plug 125 provided with a male thread (not shown) to the shaft 122 having a receiving female thread in the inner cavity (not shown).

The terminal end tip 125a of the second end plug 125 is rotationally symmetrical for providing rotation in respect to the dolly 100, more specifically to the second pivot point 113b of the longitudinal cross beam 113. According to the illustrated example of FIG. 6, the terminal end tip 125a is cylindrical for sturdy rotation in the cylindrical opening of the pivot point 113b.

Turning now to FIG. 7, which shows the first end plug 124 in greater detail. In essence, the first end plug 124 includes four portions 124a to 124d shaped to provide the three functions mentioned above. Looking at the surface in closest proximity to the biasing member 123 (see FIG. 5), the first end plug 124 includes a form-locking shape 124d, such as a groove, for locking the first end plug 124 angularly to the biasing member 123. The body portion 124c of the first end plug 124 extends from the surface proximal to the biasing member 123 along the axis of revolution R. The body portion 124c may be cylindrical and dimensioned to establish sliding fit in respect to the inner cavity of the shaft 122 for providing rotation there between about the axis of revolution R as well as for axial displacement along the axis of revolution R.

Extending from the cylindrical body portion 124c is a rotationally non-symmetrical shape 124b. The rotationally non-symmetrical shape 124b in the embodiment illustrated in the Figs. takes the shape of a blunt cam. The rotationally non-symmetrical shape 124b may, however, be a different rotationally non-symmetrical shape, such as a quadrangle, triangle, star, oval, etc. According to a particular embodiment, the rotationally nonsymmetrical shape 124b is designed to be engaged with a tool, such as a wrench, for rotating the first end plug 124 in respect to the shaft 122 during installation.

Extending from the rotationally non-symmetrical shape 124b along the axis of revolution R is a terminal end tip 124a, which has a rotationally symmetrical shape. Similarly to the terminal end tip 125a of the second end plug 125, the terminal end tip 124a of the first end plug 124a may be cylindrical for sturdy rotation in the opening of the pivot point 113a.

The opening of the pivot point 113a as well as the a terminal end tip 124a and rotationally non-symmetrical shape 124b of the first end plug 124 are dimensioned such that the rotationally non-symmetrical opening 113a in the longitudinal cross beam 113 is configured to receive the rotationally symmetrical terminal end tip 124a of the first end plug 124 in a rotatable manner in a retracted axial position of the first end plug 124, and on the other hand to receive the rotationally non-symmetrical shape 124b of the first end plug 124 in a non-rotatable manner in an extended axial position of the first end plug 124. Such a dimensioning principle is due to the intended installation procedure described below.

The tow bar assembly 120 is intended to be installed to the dolly 100 partially preassembled. The tow bar 121 is preformed to include the mutually angled portions and the hitch at the end of the longer portion. Also, the shaft 122 is attached to the shorter portion of the tow bar 121 and the second end plug 125 is fixed into the inner cavity of the shaft 122 by welding, for example. Dollies which have been designed to receive such a tow bar assembly 120 are ready as is, whereas conventional dollies would be provided with openings 113a, 113b by drilling and machining or filing suitable holes into the longitudinal cross beams 113.

In the installation procedure, the biasing member 123 is firstly inserted into the inner cavity of the shaft 122 so that the second coupling portion 123c of the biasing member 123 locks into place to the receiving groove (not shown) on the second end plug 125. With the biasing member 123 in place, the first end plug 124 is inserted into the inner cavity of the shaft 122 by simply sliding the first end plug 124 in by virtue of the sliding fit there between. The first end plug 124 is rotated in the inner cavity of the shaft 122 so as to lock the first coupling portion 123a into place to the receiving form-locking shape 124d, i.e. groove, in the first end plug 124.

With the biasing member 123 enclosed by the shaft 122 and end plugs 124, 125, the biasing member 123 is compressed by pressing the first end plug 124 inward into the inner cavity of the shaft. With the first end plug 124 in the retracted axial position, the tow bar assembly 120 is positioned in respect to the dolly 100 by inserting the terminal tip 125a of the second end plug 125 into the receiving opening 113b in the longitudinal cross beam 113. The terminal tip 124a of the first end plug 124 is thereafter aligned with the rotationally non-symmetrical opening 113a in the opposing longitudinal cross beam 113. The rotationally non-symmetrical opening 113a is dimensioned such that the terminal tip 124a of the first end plug 124 may rotate therein. Expelled by the axial spring-back factor of the biasing member 123, the first end plug 124 is driven outward along the axis of revolution R such that the terminal tip 124a is inserted into the rotationally non-symmetrical opening 113a along the axial length of the terminal tip 124a.

At that stage, the rotationally non-symmetrical shape 124b of the first end plug 124 has not yet become recessed into the rotationally non-symmetrical opening 113a because it should not be angularly aligned. This matter may be taken into consideration in designing the angular position of the second end plug 125 and the coupling portions 123a, 123c of the biasing member.

Next, the biasing member 123 is pre-tensioned by rotating the first end plug 124 in respect to the shaft 122. Since the rotationally non-symmetrical shape 124b of the first end plug 124 is not embedded into the opening 113a, the rotationally non-symmetrical shape 124b is engaged with a tool, such as a wrench, and rotated. During the rotation of the first end plug 124, the biasing member 123, which is at the other end fixed to the shaft 122 via the second end plug 125, undergoes winding and thus is pre-tensioned. The first end plug 124 is simultaneously aligned with the rotationally non-symmetrical shape of the opening at the pivot point 113a on the longitudinal cross beam 113. When the rotationally non-symmetrical shape 124b of the first end plug 124 is aligned with the rotationally non-symmetrical opening 113a, the first end plug 124—driven by the axial spring-back factor of the biasing member 123—is expelled into the extended axial position, where the first end plug 124 locks into the rotationally non-symmetrical opening 113a.

In the fully assembled state, the tow bar assembly 120 may be removed from the dolly 100 by pressing the first end plug 124 inward axially. The first end plug 124 is accessible from underneath the dolly 100, wherein a thin object, such as a paper clip, may be used to press the terminal tip 124a of the first end plug 124. When the axial spring-back factor of the biasing member 123 is exceeded, the rotationally non-symmetrical shape 124b of the first end plug 124 is retracted from the corresponding opening 113a, where after the tow bar assembly 120 may be dis-assembled in a reverted fashion in respect to assembly.

Above, only exemplary illustrated embodiments have been described. It is, however, to be understood that the inventive concept may be executed in manners deviating from the above description. For example, the interface between the shaft and the dolly, namely the end plugs, may be inverted such that the longitudinal cross beams have a rotationally symmetrical protrusion and an opposing rotationally non-symmetrical protrusion. The protrusions would be designed to cooperate with respective recessions at the terminal end surfaces of the end plugs of the shaft. Such a tow bar assembly would be installed similarly to the illustrated example with the difference that rotationally non-symmetrical recession in the first end plug of the shaft would lock into place by rotating the end plug for aligning the rotationally non-symmetrical shapes of the end plug and the protrusion of the longitudinal cross beam.

A skilled person may foresee further deviations from the above description without departing from the invention, which is defined by the appended claims.

The invention claimed is:

1. A tow bar assembly for a dolly, the tow bar assembly comprising:
    a tow bar,
    a shaft having a first end and a second end opposing the first end, from which ends the shaft is configured to connect the tow bar to the dolly so as to provide rotation of the tow bar in respect to the dolly about an axis of revolution, and
    a biasing member, configured to bias the tow bar towards an upright orientation about the axis of revolution, wherein:
    the shaft comprises an inner cavity extending along the axis of revolution,
    the biasing member is arranged into the cavity of the shaft and rotationally secured thereto, and in that
    the shaft comprises a first end plug at the first end of the shaft for enclosing the biasing member to the cavity, the first end plug is configured to rotationally lock the biasing member to the dolly.

2. The tow bar assembly according to claim 1, wherein the shaft is fixed to the tow bar.

3. The tow bar assembly according to claim 1, wherein the first end plug comprises a form locking shape, for engaging the biasing member.

4. The tow bar assembly according to claim 1, wherein an end of the first end plug distal to the biasing member comprises a rotationally symmetrical shape.

5. The tow bar assembly according to claim 1, wherein the first end plug comprises a rotationally non-symmetrical shape, for engaging to the dolly.

6. The tow bar assembly according to claim 5, wherein the rotationally non-symmetrical shape for engaging to the dolly is shaped to be engaged with a tool.

7. The tow bar assembly according to claim 1, wherein the first end plug comprises:
    a form locking shape for engaging the biasing member formed to the surface proximal to the biasing member,
    a rotationally symmetrical body portion extending from the surface proximal to the biasing member along the axis of revolution,
    a rotationally non-symmetrical shape extending from the body portion along the axis of revolution and
    a rotationally symmetrical shape extending from the rotationally nonsymmetrical shape.

8. The tow bar assembly according to claim 1, wherein the first end of the shaft is configured to be rotationally locked in respect to the dolly, whereas the second end of the shaft is configured to be rotated in respect to the dolly.

9. The tow bar assembly according to claim 1, wherein the first end plug is arranged in the cavity of the shaft through a sliding fit.

10. The tow bar assembly according to claim 1, wherein the biasing member is configured to resist winding and compression.

11. The tow bar assembly according to claim 1, wherein the biasing member is a spring.

12. The tow bar assembly according to claim 1 included in a dolly.

13. The tow bar assembly according to claim 1, wherein the shaft comprises a second end plug fixed to the second end of the shaft for enclosing the biasing member to the cavity, the second end plug is configured to rotationally lock the biasing member to the shaft.

14. The tow bar assembly according to claim 13, wherein the second end plug comprises:
    a form locking shape for engaging to the biasing member and
    a rotationally symmetrical shape for engaging to the dolly in a rotatable manner, the rotationally symmetrical shape distal from the form locking shape for engaging to the biasing member.

15. The tow bar assembly of claim 13 included in a dolly, wherein the dolly comprises a chassis with at least two mutually parallel beams arranged at a distance from each other, wherein one of said beams comprises a rotationally nonsymmetrical opening for receiving the rotationally non-symmetrical shape of the first end plug and the other one of said beams comprises a rotationally symmetrical opening for receiving the rotationally symmetrical shape of the second end plug.

16. The tow bar assembly according to claim 15, wherein the rotationally non-symmetrical opening of the dolly is dimensioned to:
    receive the rotationally symmetrical shape of the first end plug in a rotatable manner in a retracted axial position of the first end plug, and to
    receive the rotationally non-symmetrical shape of the first end plug in a non-rotatable manner in an extended axial position of the first end plug.

17. The tow bar assembly according to claim 15, wherein the chassis of the dolly comprises:
    two mutually parallel longitudinal peripheral supports,
    two mutually parallel transversal peripheral supports connected by the longitudinal peripheral supports to form a rectangular frame,
    wherein:
    said beams are longitudinal cross beams and
    the shaft is configured to span the longitudinal cross beams within the periphery of the frame of the chassis and is protected by at least one of the transversal peripheral supports.

* * * * *